G. H. DAUGHERTY.
DIVIDER FOR MOWING AND REAPING MACHINES.
APPLICATION FILED OCT. 27, 1910.
1,005,169.
Patented Oct. 10, 1911.
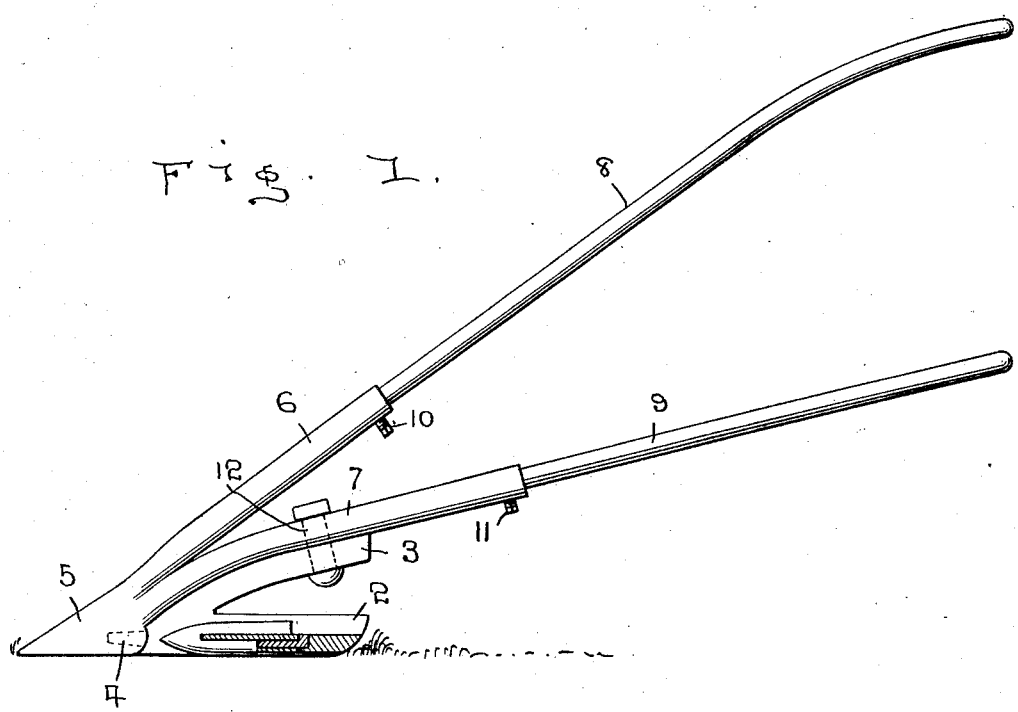
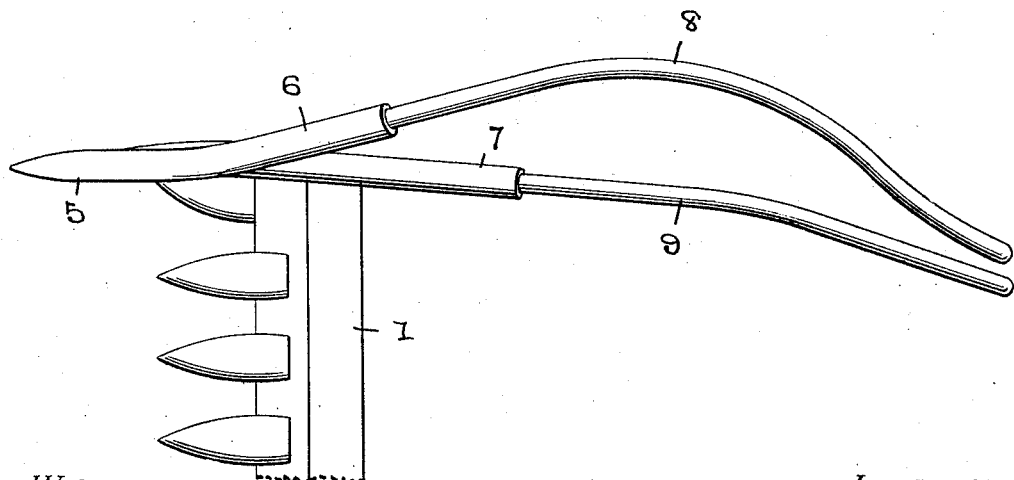
WITNESSES:
INVENTOR
G. H. Daugherty
BY
W. J. FitzGerald
Attorneys

UNITED STATES PATENT OFFICE.

GILES H. DAUGHERTY, OF CHICO, OREGON.

DIVIDER FOR MOWING AND REAPING MACHINES.

1,005,169.  Specification of Letters Patent.  Patented Oct. 10, 1911.

Application filed October 27, 1910. Serial No. 589,337.

*To all whom it may concern:*

Be it known that I, GILES H. DAUGHERTY, a citizen of the United States, residing at Chico, in the county of Wallowa and State of Oregon, have invented certain new and useful Improvements in Dividers for Mowing and Reaping Machines; and I do hereby declare the following to be a full, clear, and exact description of the invention, such as will enable others skilled in the art to which it appertains to make and use the same.

My invention relates to new and useful improvements in dividers for mowing and reaping machines and my object is to provide a divider frame having tubular sockets thereon to receive rods.

A further object is to provide means for holding the rods in adjusted relationship with the sockets, and a further object is to provide means for removably attaching the divider to the shoe of a sickle bar.

Other objects and advantages will be hereinafter set forth and pointed out in the specification.

In the accompanying drawings, which are made a part of this application, Figure 1 is a sectional view through a sickle bar showing my improved divider in side elevation, and, Fig. 2 is a top plan view thereof.

Referring to the drawings in which similar reference numerals designate corresponding parts throughout the several views, 1 indicates a sickle bar, which may be constructed in the usual or any preferred manner, and 2 indicates the shoe at the outer end of the sickle bar.

Extending upwardly and rearwardly from the forward portion of the shoe 2 is an arm 3, while extending forwardly from the shoe is a prong 4, which prong is adapted to enter an opening in the divider frame 5. The forward portion of the frame 5 is brought to a point, as best shown in Fig. 2, whereby it will readily pass through the standing grass or grain, while the rear portion of the frame terminates in tubular sockets 6 and 7, the socket 7 preferably resting upon the arm 3 and conforming to the contour thereof, while the socket 6 extends at a more increased angle and above the socket 7. Entering the sockets 6 and 7 are rods 8 and 9, respectively, which rods are adapted to guide the grain, etc., after it has been cut and move the same away from the standing grain. The rods are adjustable within said sockets, whereby they may be lengthened or shortened for use in connection with grain or grass of varying heights, and are held in their adjusted positions by means of set screws 10 and 11. The forward end of the rod 9 is slightly bent inwardly while the rod 8 is bent to a greater degree in its length so that said rods will have substantially the same effect upon the grass as the mold board of a plow has to the soil, the peculiar curvature of said rods moving the cut grass to some distance from the standing grass. The forward end of the rod 8 preferably terminates substantially in line above the rod 9 and by properly adjusting the rods in their sockets, the divider can be readily adapted for use in connection with grass of varying lengths. The socket 7 extends substantially at right angles to the longitudinal plane of the sickle bar, while socket 6 is extended outwardly so as to properly receive the rod 8 and also to render the curvature of the rod and socket symmetrical.

In conjunction with the prong 4 the divider is held in position on the shoe by extending a bolt 12 through the arm 3 and the socket 7. By placing the frame forwardly of the shoe the division of the grain is substantially made before it is cut by the sickle, and by extending the socket 6 outwardly and curving the rod in the manner shown, the standing grain or grass will be moved away from the cut grain or grass, thereby making a positive separation between the cut and standing grass, regardless of how tangled the grass may be, and by making the primary separation before the grass is cut the cut grass is prevented from falling over the divider at the end of the sickle bar.

What I claim is:

In combination, a sickle bar, a shoe secured on one end of the sickle bar and formed with a forwardly projecting prong and a rearwardly extending overhanging arm, a divider comprising a frame having an opening to receive the prong and upwardly and rearwardly extending tubular members, one of said members being disposed over the overhanging arm, a bolt connecting said member and arm, and rods secured in said tubular members.

In testimony whereof I have signed my name to this specification in the presence of two subscribing witnesses.

GILES H. DAUGHERTY.

Witnesses:
ALBERT S. COOLEY,
D. W. SHEAHAN.

Copies of this patent may be obtained for five cents each, by addressing the "Commissioner of Patents, Washington, D. C."